United States Patent [19]

Saito

[11] Patent Number: 4,789,184

[45] Date of Patent: Dec. 6, 1988

[54] PASSIVE SEAT BELT SYSTEM

[75] Inventor: Hiroyuki Saito, Kanagawa, Japan

[73] Assignee: Nippon Seiko Kabushiki Kaisha, Tokyo, Japan

[21] Appl. No.: 85,356

[22] Filed: Aug. 14, 1987

[30] Foreign Application Priority Data

Jun. 19, 1987 [JP] Japan ............................ 62-94270[U]

[51] Int. Cl.⁴ ............................................. B60R 21/10
[52] U.S. Cl. .................................... 280/804; 297/469
[58] Field of Search ................ 280/802, 804; 297/469, 297/473

[56] References Cited

U.S. PATENT DOCUMENTS

| | | | |
|---|---|---|---|
| 4,232,885 | 11/1980 | Suzuki et al. | 280/804 |
| 4,394,036 | 7/1983 | Hildebrandt | 280/804 |
| 4,422,668 | 12/1983 | Thill et al. | 280/804 |
| 4,436,323 | 3/1984 | Yamamoto | 280/804 |
| 4,483,553 | 11/1984 | Nogiwa et al. | 297/469 |
| 4,597,588 | 7/1986 | Kawai | 280/808 |

FOREIGN PATENT DOCUMENTS

| | | | |
|---|---|---|---|
| 83724 | 7/1983 | European Pat. Off. | 280/804 |
| 140252 | 8/1982 | Japan | 280/804 |

Primary Examiner—David Mitchell
Assistant Examiner—Ross Weaver
Attorney, Agent, or Firm—Wegner & Bretschneider

[57] ABSTRACT

A passive seat belt system is equipped with a guide rail, a slide anchor movable along the length of the guide rail and connected to one end of an occupant restraining webbing, and a drive means for causing the slide anchor to move along the length of the guide rail between an occupant restraining position and an occupant releasing position. Both end faces of the slide anchor as viewed in both running directions of the slide anchor flare out form the side of the webbing toward the side of the guide rail in the respective running directions.

18 Claims, 8 Drawing Sheets

PASSIVE SEAT BELT SYSTEM

BACKGROUND OF THE INVENTION

(1) Field of the Invention

This invention relates to a passive seat belt system for automatically applying a restraint webbing to an occupant after he has seated himself in a vehicle, especially, to the structures of a slide anchor, which serves to carry an associated webbing and assures increased safety upon running along the length of an associated guide rail, and an end member provided on the slide anchor, such as emergency release buckle (ERB) or cover.

(2) Description of the Prior Art

Among passive seat belt systems for automatically applying a restraint webbing to an occupant, those equipped with a slide anchor which runs with a webbing carried thereon along the length of a guide rail provided in a vehicle have heretofore involved potential inconvenience that a part of a passenger's body such as hand, fingers or ear or an object such as stationary or clothing could be bitten or caught in a gap between the slide anchor and an end member attached as a unitary member to the slide anchor, such as emergency release buckle (ERB) or cover. The above inconvenience has been considered undesirable from the standpoint of the safety and reliability of such passive seat belt systems and has caused from time to time troubles and the like due to application of large loads to various parts of the systems. A typical example of such conventional passive seat belt systems will next be described with reference to FIGS. 11 and 12.

FIG. 11 schematically illustrates a general passive seat belt system, whereas FIG. 12 is a fragmentary front view of a conventional slide anchor and guide rail. In FIG. 12, there are shown a webbing 1a, an emergency release buckle 3a as an end member, a buckle main body 3a' attached to a slide anchor 4a which will be described subsequently, a tongue 3a" releasably latched with the buckle main body 3a' and carrying the webbing 1a fastened at an one end portion thereof on the tongue 3a", and a guide rail 6a. The width of the slide anchor 4a as viewed in both running directions of the slide anchor 4a has conventionally tapered or narrowed down from an upper end face 42a of the buckle main body 3a', which is located on the side of the webbing 1a, toward a lower edge portion 61a of the guide rail 6a or a trim, lip or the like (hereinafter called "the lower edge portion of the guide rail" collectively) as illustrated in FIG. 12. As a result, an acute angle $\theta$ is formed between each of end faces 41a,41'a of the slide anchor 4a as viewed in both running directions of the slide anchor 4a and the lower edge portion 61a of the guide rail 6a. This structure has potential inconvenience that a hand, fingers or an object may be bitten or caught in pockets indicated by A in FIG. 12.

SUMMARY OF THE INVENTION

With the foregoing in view, the present invention has as a principal object the provision of a passive seat belt system which is free of the above-described inconvenience.

The present inventor has carried out an extensive investigation with a view toward fulfilling the above object of this invention. As a result, it has been found the inconvenience of the aforementioned passive seat belt systems can be solved by forming both end faces of a slide anchor as viewed in both running directions of the slide anchor in such a way that the end faces of the slide anchor flare out from the side of an associated webbing toward the side of an associated guide rail in the corresponding running directions, namely, the slide anchor has a subtantially sectorial shape as a whole, leading to completion of this invention.

In one aspect of this invention, there is thus provided a passive seat belt system equipped with:

a guide rail;

a slide anchor movable along the length of the guide rail and connected to one end of an occupant restraining webbing; and a drive means for causing the slide anchor to move along the length of the guide rail between an occupant restraining position and an occupant releasing position, the improvement wherein both end faces of the slide anchor as viewed in both running directions of the slide anchor flare out from the side of the webbing toward the side of the guide rail in the respective running directions.

In another aspect of this invention, there is also provided a passive seat belt system equipped with:

a guide rail;

a slide anchor movable along the length of the guide rail and connected to one end of an occupant restraining webbing by way of a connecting means, said connecting means including a first member attached to the slide anchor and a second member engageable with the first member, said one end of said webbing being fastened to the second member; and a drive means for causing the slide anchor to move along the length of the guide rail between an occupant restraining position and an occupant releasing position, the improvement wherein both end faces of the second member as viewed in both running directions of the slide anchor flare out from the side of the webbing toward the side of the guide rail in the respective running directions.

In a further aspect of this invention, there is also provided a passive seat belt system equipped with:

a guide rail having at least one bent portion;

a slide anchor movable along the length of the guide rail and connected to one end of an occupant restraining webbing via a connecting means, said connecting means including a first member attached to the slide anchor and a second member engageable with the first member, said one end of said webbing being fastened to the second member; and a drive means for causing the slide anchor to move along the length of the guide rail between an occupant restraining position and an occupant releasing position, the improvement wherein an upper end face of the first member, said upper end face being located in opposition to a lower edge portion of the guide rail, is formed into a substantially arcuate shape conforming approximately with the curvature of the lower edge portion of said at least one bent portion of the guide rail so as to narrow down the gap between the lower edge portion of the guide rail and the upper end face of the first member.

In a still further aspect of this invention, there is also provided a passive seat belt system equipped with:

a guide rail having at least one bent portion;

a slide anchor movable along the length of the guide rail and connected to one end of an occupant restraining webbing via a connecting means, said connecting means including a first member attached to the slide anchor and a second member engageable with the first member, said one end of said webbing being fastened to the second member; and a drive means for causing the slide anchor to move along the length of the guide rail between an occupant restraining position and an occupant releasing position, the improvement wherein an upper end face of the second member, said upper end face being located in opposition to a lower edge portion of the guide rail, is formed into a substantially arcuate shape conforming approximately with the curvature of the lower edge portion of said at least one bent portion of the guide rail so as to narrow down the gap between the lower edge portion of the guide rail and the upper end face of the second member.

In a still further aspect of this invention, there is also provided a passive seat belt system equipped with:

a guide rail having at least one bent portion;

a slide anchor movable along the length of the guide rail and connected to one end of an occupant restraining webbing;

a means covering a connecting part between the slide anchor and said one end of the occupant restraining webbing;

a drive means for causing the slide anchor to move along the length of the guide rail between an occupant restraining position and an occupant releasing position, the improvement wherein an upper end face of said cover means, said upper end face being located in opposition to a lower edge portion of the guide rail, is formed into a substantially arcuate shape conforming approximately with the curvature of the lower edge portion of said at least one bent portion of the guide rail so as to narrow down the gap between the lower edge portion of the guide rail and the upper end face of said cover means.

According to the present invention, a hand or fingers or an object is not bitten or caught between a slide anchor and its associated guide rail unlike conventional passive seat belt systems of the same kind even when the hand or fingers or the object is brought into contact with a leading end face of the slide anchor as viewed in the running direction of the slide anchor, because a force which the hand or fingers or the object receives is applied in a direction away from the guide rail and hence pushes out the hand or fingers or the object. The hand or fingers or the object is therefore not bitten or caught between the slide anchor and guide rail. This also assures smooth and reliable running for the slide anchor. The passive seat belt system of this invention develops little trouble and enjoys good durability, since it is free from undue loads which would otherwise be applied by biting or catching of a part of a passenger's body or an object between the slide anchor and guide rail.

BRIEF DESCRIPTION OF THE DRAWINGS

The above and other objects, features and advantages of the present invention will become apparent from the following description of the invention and the appended claims, taken in conjunction with the accompanying drawings, in which:

DETAILED DESCRIPTION OF THE INVENTION AND PREFERRED EMBODIMENTS

The first to seventh embodiments of this invention will hereinafter be described with reference to FIGS. 1 through 11 the accompanying drawings.

Figure 1:
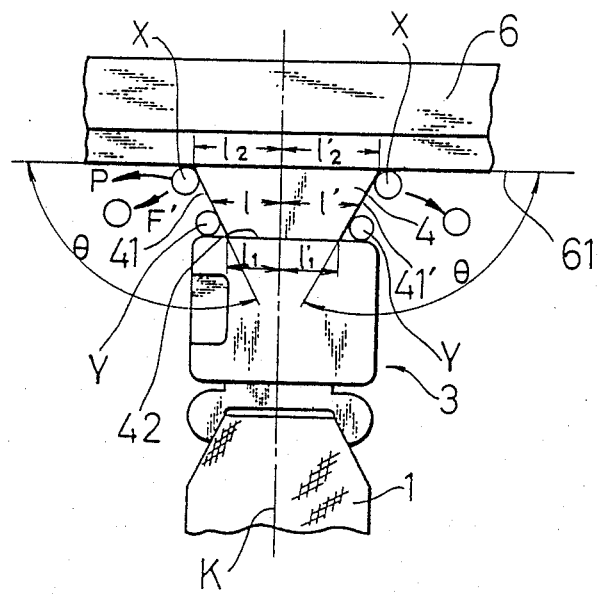
FIG. 1 is a fragmentary front view of a passive seat belt system according to a first embodiment of this invention.

In the first embodiment of this invention shown in FIG. 1, a slide anchor 4 which runs along the length of a guide rail 6 is provided at a lower end portion thereof with an end member 3 such as emergency release buckle (ERB) or cover. A webbing 1 is connected to the end member 3. End faces 41,41' of the slide anchor 4 as viewed in both running directions of the slide anchor 4 flare out from the side of the webbing (i.e., from an upper end face 42 shown in the drawing) toward the guide rail 6 in the corresponding running directions. The slide anchor 4 is hence formed into a substantially sectorial shape so that the distances $l,l'$ from the central axis K of the slide anchor 4, said axis extending at a right angle relative to the guide rail 6, become greater as a lower edge portion 61 is approached, namely, from distances $l_1,l_1'$ at the upper end face 42 of the end member 4 to the distances $l_2,l_2'$ at the lower edge portion 61 of the guide rail 6. The angle $\theta$ between the lower edge portion 61 of the guide rail 6 and the end faces 41,41' of the slide anchor 4 as viewed in both running directions of the slide anchor 4 is obtuse in this embodiment. Even when a hand or fingers or an object X is brought into contact with the corresponding end face 41 or 41' in the course of running of the slide anchor 4, a force F' corresponding to a drive force P of the slide anchor 4 is applied to the hand or fingers or the object X so that the hand or fingers or the object X is pushed out in a direction away from the guide rail 6.

Figure 2:
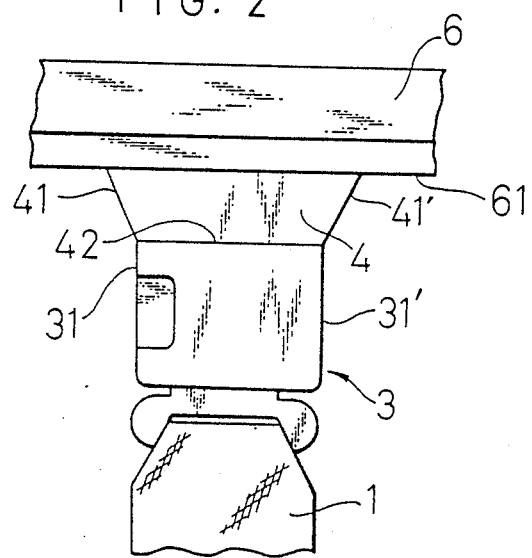
FIG. 2 is a fragmentary front view of a passive seat belt system according to a second embodiment of this invention.

The second embodiment of this invention is now described with reference to FIG. 2, in which both end faces 41,41' of the slide anchor 4 are formed without any steps between the end faces 41,41' and their corresponding end faces 31,31' of the end member 3 as viewed in both running directions. Where there is a step between the slide anchor 4 and the leading end face of the end member 3, there is potential inconvenience that an object or the like could be caught in a recess (Y in FIG. 1) which is formed at the step between the slide anchor 4 and the leading end face of the end member 3. The second embodiment can avoid such inconvenience.

Figure 3:
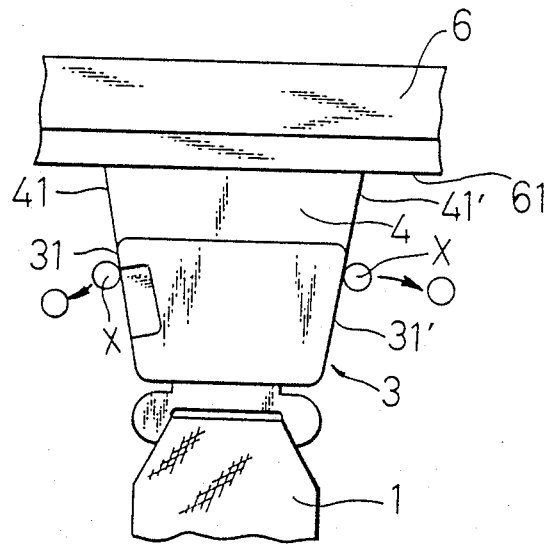
FIG. 3 is a fragmentary front view of a passive seat belt system according to a third embodiment of this invention.

Referring next to FIG. 3 which illustrates the third embodiment of this invention, the end faces 41,41' of the slide anchor 4 and the corresponding end faces 31,31' of the end member 3 are formed into continuous shapes so that steps are eliminated therebetween as in the second embodiment and moreover they are flush relative to each other. The third embodiment can avoid potential inconvenience that an object or the like could be caught in the recess Y (see FIG. 1) at the step between the end member 3 and each leading end face of the slide anchor 4. Moreover, the end faces 31,31' of the end member 3 also form parts of a substantially sectorial shape defined by the end faces 41,41' of the slide anchor 4. Even when the hand or fingers or the object X is brought into contact with the end face 31 or 31' of the end ember 3, a force is also applied in a direction away from the lower edge portion 61 of the guide rail 1. The faces which serve to push out the hand or fingers or the object X have hence been enlarged, thereby enhancing the safety further.

Figure 4:
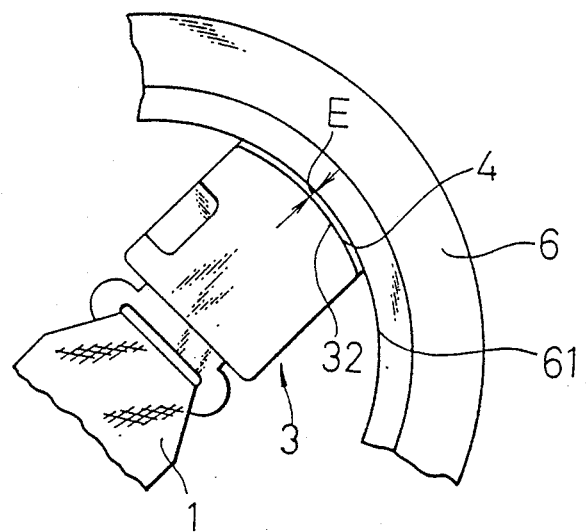
FIG. 4 is a fragmentary front view of a passive seat belt system according to a fourth embodiment of this invention.
Figure 5A:
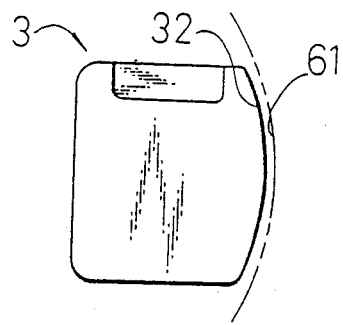
FIGS. 5(a) through 5(d) respectively illustrate examples of an end member in the passive seat belt system of the fourth embodiment.
Figure 5B:
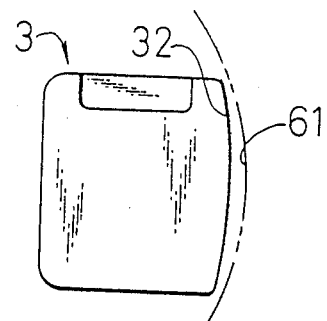
Figure 5C:
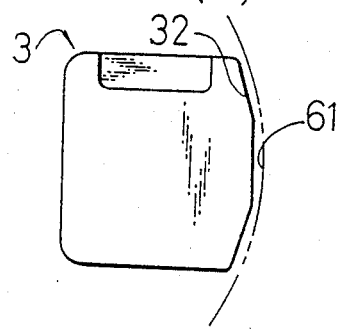
Figure 5D:
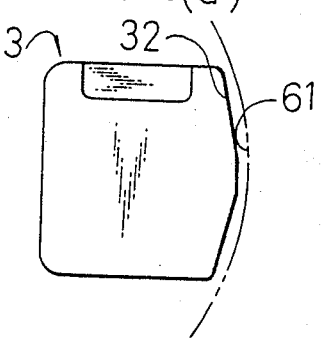

In the fourth embodiment of this invention depicted in FIG. 4, an upper end face 32 of the end member 3 is formed into a substantially arcuate shape in accordance with the curvature of a bent portion of the guide rail 6 so as to minimize a gap E between the upper end face 32 and the lower edge portion 6 of the guide rail 6. A gap in the shape of a segment of a circle has heretofore been formed between the lower edge portion 61 of the guide rail and the upper end face of a conventional end member at such a bent portion of the guide rail 6, so that an object or the like is often bitten or caught in the gap. In the fourth embodiment, the upper end face 32 of the end member 3 is extended centrally and upwardly into the substantially arcuate shape so as to narrow down the gap E between the upper end face 32 and the lower edge portion 61 of the guide rail 6. It is therefore possible to avoid catching or biting of an object or the like even at the bent portion of the guide rail 6. The upper end face 32 of the end member 3 may take various shapes as shown by way of example in FIGS. 5(a) to 5(d) so long as it corresponds substantially to the curvature of the lower edge portion of the bent portion of the guide rail 6. Needless to say, the upper end face 32 may be formed into a polygonal shape.

Figure 6:
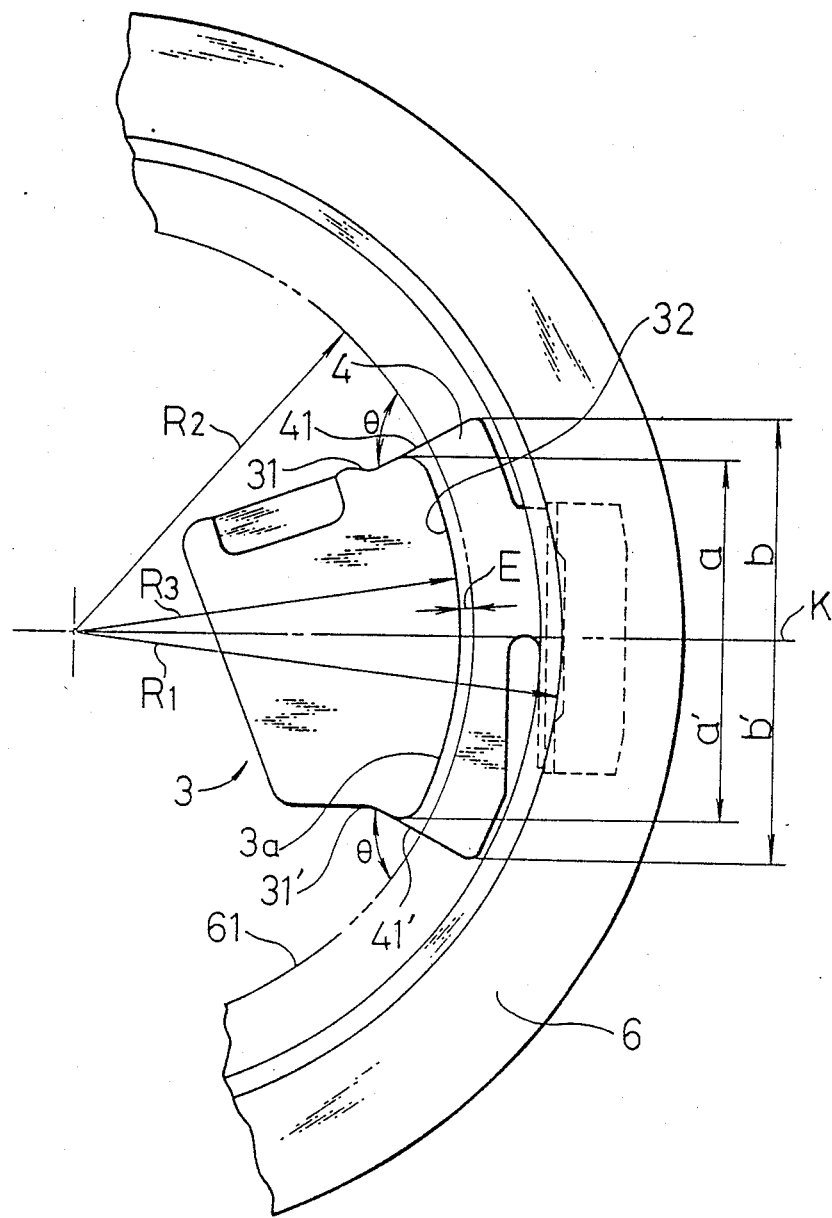
FIGS. 6 and 7 are fragmentary front views of a passive seat belt system according to a fifth embodiment of this invention.

FIG. 6 illustrates the fifth embodiment of this invention. The fifth embodiment includes all the advantageous features of the first to fourth embodiments of this invention and is one of most preferable embodiments of this invention. Parts of the end faces 41,41' of the slide anchor 4 and parts of their corresponding end faces 31,31' extend continuously so that they forms a sectorial shape flaring out toward the lower edge portion 61 of the guide rail 6 in both running directions of the slide anchor 4. The upper end face 32 of the end member 3 has the substantially arcuate shape which is approximately in conformity with the curvature of the lower edge portion 61 of the guide rail 6, whereby the gap E between the upper end face 32 and the lower edge portion 61 is minimized. Further, it is preferable that the turning center of the slide anchor 4, the center of curvature of the lower edge portion 61 of the guide rail 6 and the center of the substantially arcuate contour of the upper end face 32 of the end member 3 coincide at one common point. Preferably, the distances a,a' and b,b' of distal ends of the end faces of the slide anchor 4 and end member 3, said distal ends being closest to the guide rail 6, from the central axis of the slide anchor 4 and end member 3, said central axis extending at a right angle relative to the guide rail 6 satisfy the following relation: a≈a' and b≈b'.

Figure 8:
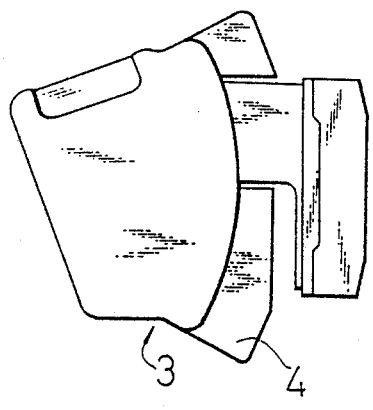
FIGS. 8(a) and 8(b) respectively show exemplary structures of a substantial sectorial portion of a slide anchor.
Figure 8B:
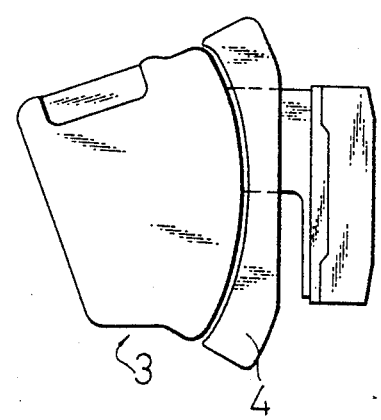
Figure 7:
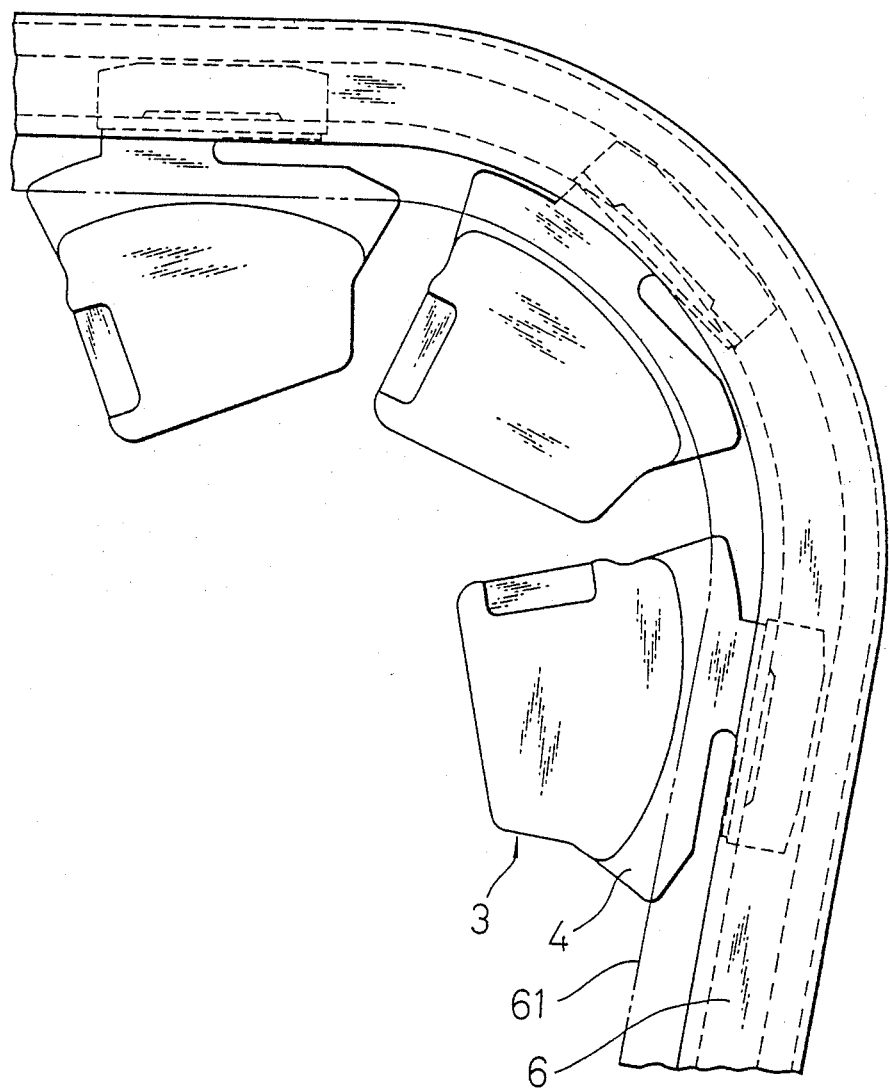

FIG. 7 illustrates the manner of running of the slide anchor 4 and end member 3 along the length of the guide rail 6 in the fifth embodiment. The structure of the fifth embodiment can almost completely avoid the inconvenience that the slide anchor 4 bites or catches a hand, fingers, an object or the like in the course of its running. Incidentally, the sectorial portion of the slide anchor 4 may be formed by a part of the end member 3 as depicted in FIG. 8(a) or by providing a separate member as shown in FIG. 8(b).

Figure 9:
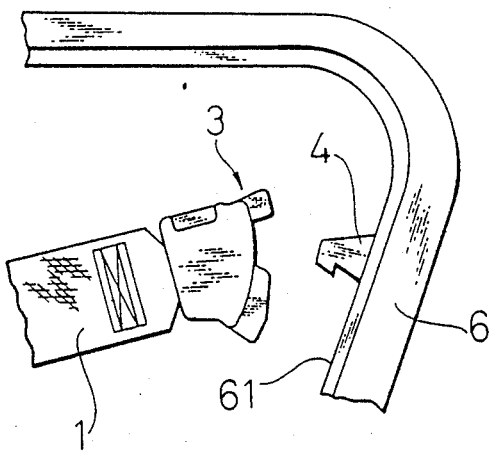
FIG. 9 is a fragmentary front view of a passive seat belt system according to a sixth embodiment of this invention, in which an end member is detachable from its associated slide anchor.
Figure 12:
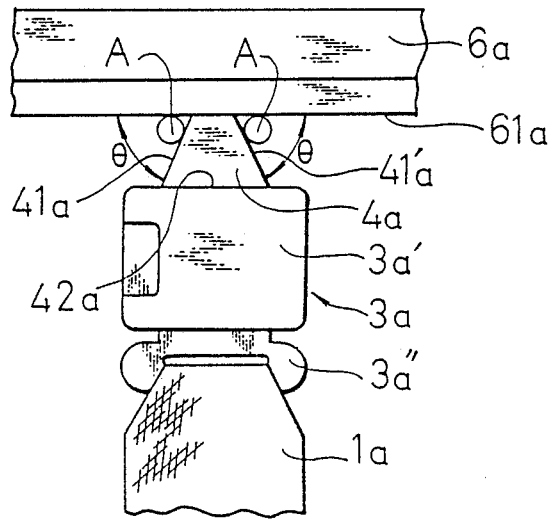
FIG. 12 is a fragmentary front view of a conventional passive seat belt system.
Figure 10:
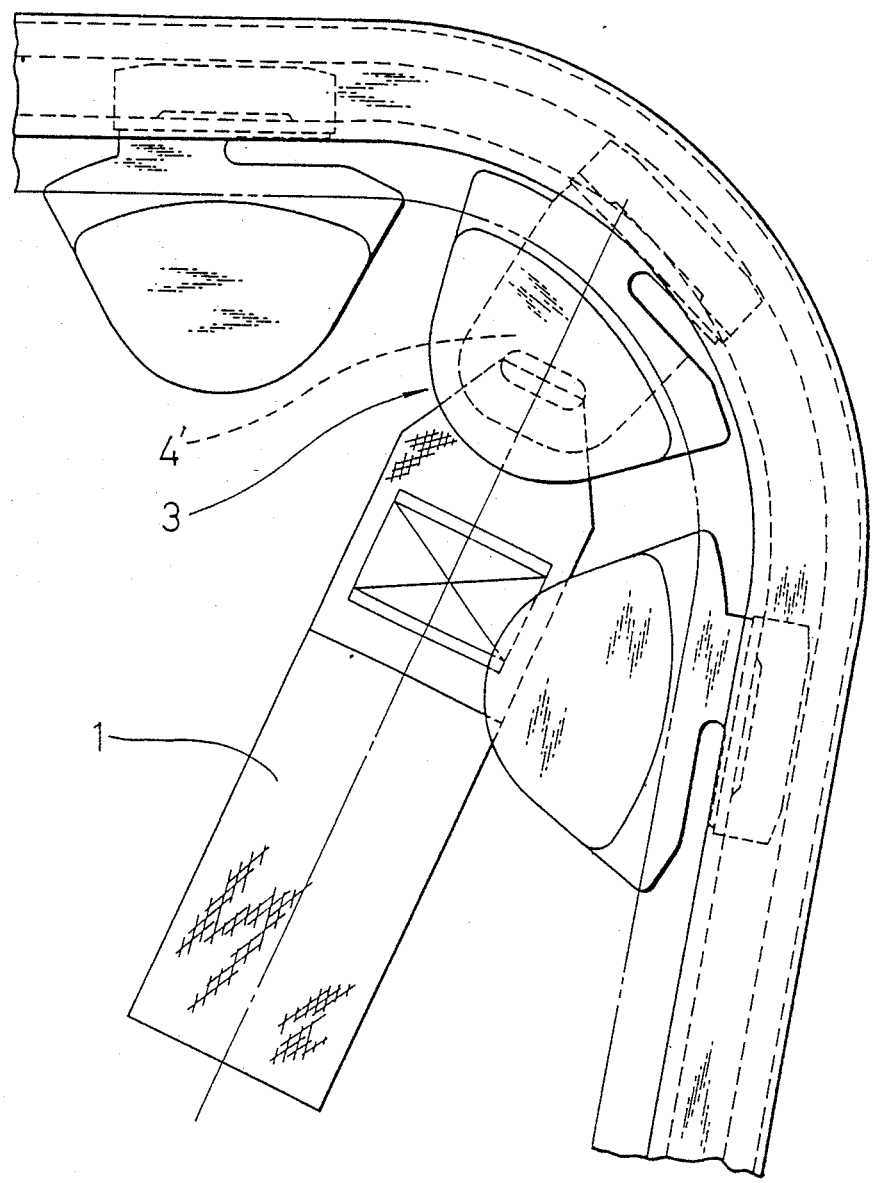
FIG. 10 is a fragmentary front view of a passive seat belt system according to a seventh embodiment of this invention, in which a webbing is connected directly to a slide anchor.
Figure 11:
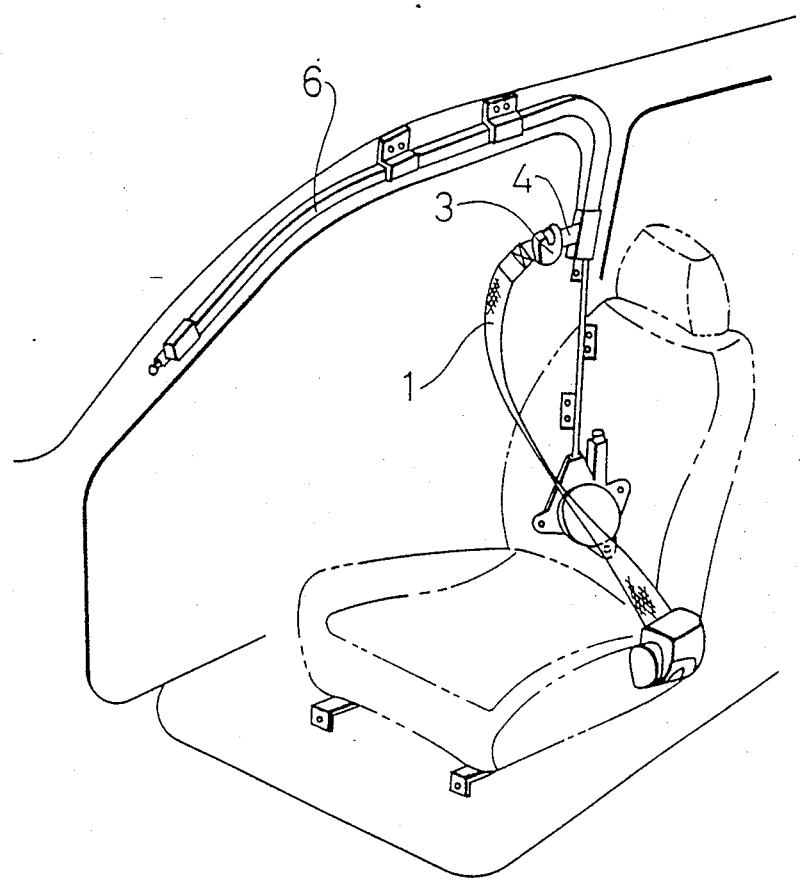
FIG. 11 illustrates a general passive seat belt system, to which the present invention is applicable effectively.

In each of the above-described embodiments, the end member is provided as a unitary member with the slide anchor. The end member may be detachably provided with the slide anchor as illustrated in FIG. 9. Another alternative is shown in FIG. 10, in which the webbing 1 is connected directly to a slide anchor 4' and an end member 3' is formed as a cover enclosing a connecting part between the slide anchor 4' and the webbing 1.

Having now fully described the invention, it will be apparent to one of ordinary skill in the art that many changes and modifications can be made thereto without departing from the spirit or scope of the invention as set forth herein.

I claim:

1. A passive seat belt system comprising:
   a guide rail;
   a slide anchor movable along the length of the guide rail and connected to one end of an occupant restraining webbing;
   a drive means for causing the slide anchor to move along the length of the guide rail between an occupant restraining position and an occupant releasing position; and
   a means for connecting the slide anchor and webbing to each other, comprising a first member attached to the slide anchor and a second member engageable with the first member, the webbing being fastened at the one end thereof on the second member;
   wherein both end faces of the slide anchor as viewed in both running directions of the slide anchor flare out from the side of the webbing toward the side of the guide rail in the respective running directions; and
   wherein at least one of end faces of the first member as viewed in both running directions of the slide anchor is formed without any step between said at least one end face of the first member and the corresponding one of the end faces of the slide anchor.

2. The passive seat belt system as claimed in claim 1, wherein both end faces of the first member as viewed in both running directions of the slide anchor are formed without any steps between said both end faces of the first member and the corresponding end faces of the slide anchor.

3. A passive seat belt system comprising:
   a guide rail;
   a slide anchor movable along the length of the guide rail and connected to one end of an occupant restraining webbing;

a drive means for causing the slide anchor to move along the length of the guide rail between an occupant restraining position and an occupant releasing position; and a means for connecting the slide anchor and webbing to each other, comprising a first member attached to the slide anchor and a second member engageable with the first member, the webbing being fastened at the one end thereof on the second member;

the improvement wherein both end faces of the slide anchor as viewed in both running directions of the slide anchor flare out from the side of the webbing toward the side of the guide rail in the respective running directions; and wherein at least one of end faces of the first member as viewed in both running directions of the slide anchor is substantially flush relative to the corresponding one of the end faces of the slide anchor.

4. The passive seat belt system as claimed in claim 3, wherein both end faces of the first member as viewed in both running directions of the slide anchor are substantially flush relative to the corresponding end faces of the slide anchor.

5. A passive seat belt system comprising:
a guide rail;
a slide anchor movable along the length of the guide rail and connected to one end of an occupant restraining webbing;
a drive means for causing the slide anchor to move along the length of the guide rail between an occupant restraining position and an occupant releasing position; and
a means covering a connection part between the slide anchor and webbing;
the improvement wherein both end faces of the slide anchor as viewed in both running directions of the slide anchor flare out from the side of the webbing toward the side of the guide rail in the respective running directions; and
wherein at least one of end faces of said cover means as viewed in both running directions of the slide anchor is formed without any step between said at least one end face of said cover means and the corresponding one of the end faces of the slide anchor.

6. The passive seat belt system as claimed in claim 5, wherein both end faces of said cover means as viewed in both running directions of the slide anchor are formed without any steps between said both end faces of said cover means and the corresponding end faces of the slide anchor.

7. A passive seat belt system comprising:
a guide rail;
a slide anchor movable along the length of the guide rail and connected to one end of an occupant restraining webbing;
a drive means for causing the slide anchor to move along the length of the guide rail between an occupant restraining position and an occupant releasing position; and
a means covering a connection part between the slide anchor and webbing;
the improvement wherein both end faces of the slide anchor as viewed in both running directions of the slide anchor flare out from the side of the webbing toward the side of the guide rail in the respective running directions; and wherein at least one of end faces of said cover means as viewed in both running directions of the slide anchor is substantially flush relative to the corresponding one of the end faces of the slide anchor.

8. The passive seat belt system as claimed in claim 7, wherein both end faces of said cover means as viewed in both running directions of the slide anchor are substantially flush relative to the corresponding end faces of the slide anchor.

9. A passive seat belt system comprising with:
a guide rail;
a slide anchor movable along the length of the guide rail and connected to one end of an occupant restraining webbing by way of a connecting means, said connecting means including a first member attached to the slide anchor and a second member engageable with the first member, said one end of said webbing being fastened to the second member; and
a drive means for causing the slide anchor to move along the length of the guide rail between an occupant restraining position and an occupant releasing position;
wherein both end faces of the second member as viewed in both running directions of the slide anchor flare out from the side of the webbing toward the side of the guide rail in the respective running directions.

10. The passive seat belt system as claimed in claim 1 wherein:
the guide rail has at least one bent portion; and
an upper end face of the first member, said upper end face being located in opposition to a lower edge portion of the guide rail, is formed into a substantially arcuate shape conforming approximately with the curvature of the lower edge portion of said at least one bent portion of the guide rail so as to narrow down the gap between the lower edge portion of the guide rail and the upper end face of the first member.

11. The passive seat belt system as claimed in claim 10, wherein the upper end face of the first member has a polygonal shape.

12. The passive seat belt system as claimed in claim 10, wherein the distances from the central axis of the slide anchor, said central axis extending at a right angle relative to the guide rail, to the distal ends of both end faces of each of the slide anchor and the first member, said distal ends being closest to the guide rail, are substantially equal to each other.

13. The passive seat belt system as claimed in claim 9, wherein:
the guide rail has at least one bent portion; and
an upper end face of the second member, said upper end face being located in opposition to a lower edge portion of the guide rail, is formed into a substantially arcuate shape conforming approximately with the curvature of the lower edge portion of said at least one bent portion of the guide rail so as to narrow down the gap between the lower edge portion of the guide rail and the upper end face of the second member.

14. The passive seat belt system as claimed in claim 13, wherein the upper end face of the second member has a polygonal shape.

15. The passive seat belt system as claimed in claim 13, wherein the distances from the central axis of the slide anchor, said central axis extending at a right angle relative to the guide rail, to the distal ends of both end faces of each of the slide anchor and the second member, said distal ends being closest to the guide rail, are substantially equal to each other.

16. The passive seat belt system as claimed in claim 5, wherein:
   the guide rail has at least one bent portion; and
   an upper end face of said cover means, said upper end face being located in opposition to a lower edge portion of the guide rail, is formed into a substantially arcuate shape conforming approximately with the curvature of the lower edge portion of said at least one bent portion of the guide rail so as to narrow down the gap between the lower edge portion of the guide rail and the upper end face of said cover means.

17. The passive seat belt system as claimed in claim 16, wherein the upper end face of said cover means has a polygonal shape.

18. The passive seat belt system as claimed in claim 16, wherein the distances from the central axis of the slide anchor, said central axis extending at a right angle relative to the guide rail, to the distal ends of both end faces of each of the slide anchor and said cover means, said distal ends being closest to the guide rail, are substantially equal to each other.

* * * * *